(12) United States Patent
Schraudner

(10) Patent No.: US 12,332,846 B1
(45) Date of Patent: Jun. 17, 2025

(54) DATA DEDUPLICATION USING MODULUS REDUCTION ARRAYS

(71) Applicant: Salesforce, Inc., San Francisco, CA (US)

(72) Inventor: Steve Schraudner, Dunwoody, GA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/425,499

(22) Filed: Jan. 29, 2024

(51) Int. Cl.
G06F 16/17 (2019.01)
G06F 16/16 (2019.01)
G06F 16/174 (2019.01)

(52) U.S. Cl.
CPC ........ *G06F 16/1748* (2019.01); *G06F 16/164* (2019.01)

(58) Field of Classification Search
CPC ............................ G06F 16/1748; G06F 16/164
See application file for complete search history.

(56) References Cited

U.S. PATENT DOCUMENTS

2021/0099309 A1* 4/2021 Winarski ............ H04L 67/1097

* cited by examiner

*Primary Examiner* — Etienne P Leroux
*Assistant Examiner* — Cindy Nguyen
(74) *Attorney, Agent, or Firm* — Butzel Long

(57) ABSTRACT

A computer-implemented method is disclosed for data processing. The method includes receiving real-time streaming data that includes data object identifiers, arranged in a sequenced source data array, for source data objects. The method also includes determining an integer number N of data object identifiers in the source data array and selecting three mutually prime integers $N_1$, $N_2$, $N_3$ such that $N_1$ is greater than $N_2$, $N_2$ is greater than $N_3$, and an arithmetic product of $N_1$, $N_2$, $N_3$ is greater than N. The method further includes generating a first, second and third modulus reduction arrays of lengths, respectively, $N_1$, $N_2$, and $N_3$. The method also includes initializing the first, second and third modulus reduction arrays with dummy values, storing the source data objects in a source data object array, and storing the first, second and third modulus reduction arrays in a short term memory.

12 Claims, 8 Drawing Sheets

DATA DEDUPLICATION USING MODULUS REDUCTION ARRAYS

BACKGROUND

The present disclosure relates generally to a system and method for data deduplication, and specifically to data deduplication using modulus reduction arrays.

When data needs to be replicated within a computing environment, sometimes there may be overload of data updates that need to be completed within a short time window. Traditional solutions typically track each object individually and may be burdened by permanent disk delays. A disadvantage of the traditional solutions is that sometimes the objects are updated so frequently that the replication process tends to fall behind. The problem is further compounded when one object is updated multiple times in short succession but in separate processing windows. In other words, the default update process requires two or more syncs whereas only the later or the latest sync would have been sufficient. Further, traditional data tables typically contain the data in one row per object and in millions of such rows per account. The sheer size of the data tables and the associated storage speed sometimes delay the update process, owing to "write locks" and other such delay situations. There is a need for more efficient and deduplicated process of data replication and storage.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1A:
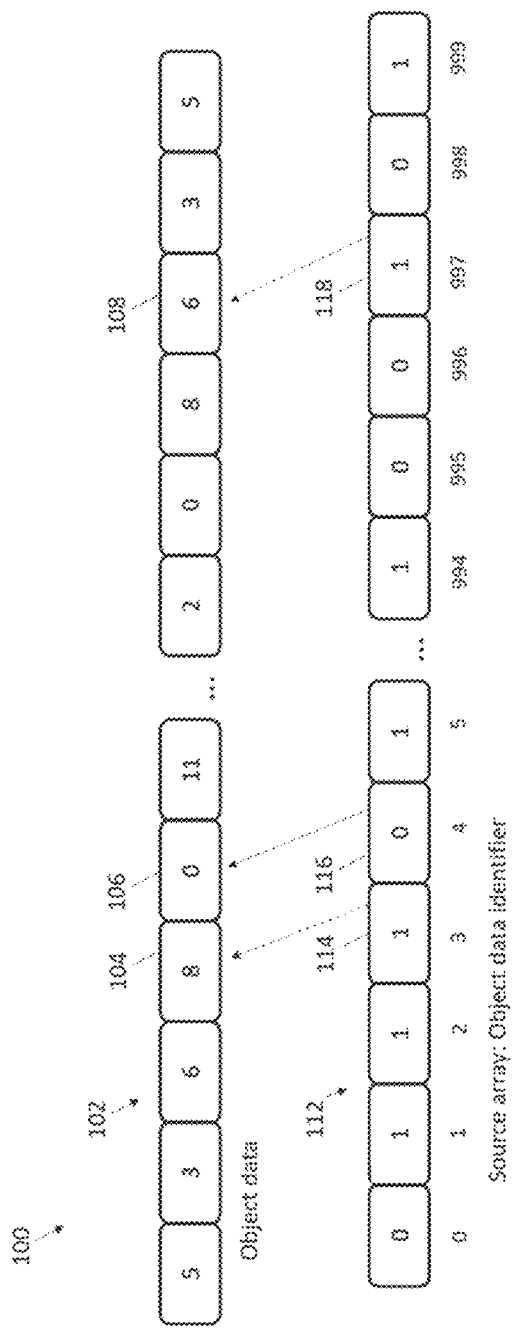
FIG. 1A illustrates a simplified block diagram illustrating a traditional method of receiving real-time streaming data and updating database tables.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments of the present disclosure describe a method and system for data deduplication that make use of mathematical properties of sequential arrays and time-based synchronization to reduce memory usage and processing such that analysis of large streaming changes can be handled in-memory efficiently. Specifically, modulus reduction arrays may be used to reduce the need for Cross-Tenant Synchronization (CTS) for massive dataset synchronization. Modulus reduction arrays are mathematical processes for arranging and rearranging data and data pointers such that a long array can be broken up into several shorter arrays with no loss of positional information. Specifically, the shorter arrays may be devised such that they have prime-numbered lengths and multiplying the lengths of these shorter arrays together produces a number larger than the original size of the longer array. The modulus reduction method may reduce the amount of storage required by one or more orders of magnitude and reduces the amount of time required to evaluate "staleness" of the data objects. In addition, the modulus reduced arrays may reside entirely in memory as opposed to disk, resulting in associated speed gains when processing the arrays and associated data stored therein.

In an aspect of the disclosed subject matter, a computer implemented method of data processing is disclosed. The method includes receiving real-time streaming data comprising a number of data object identifiers for a number of source data objects. The data object identifiers may be arranged in a sequenced source data array. The method further includes determining an integer number N of data object identifiers in the sequenced source data array and selecting three mutually prime integers $N_1$, $N_2$, and $N_3$, such that $N_1$ is greater than $N_2$, and $N_2$ is greater than $N_3$, and arithmetic product of $N_1$, $N_2$, and $N_3$ is greater than N. The method also includes generating a first modulus reduction array of length $N_1$, a second modulus reduction array of length $N_2$, and a third modulus reduction array of length $N_3$ and initializing the first modulus reduction array, the second modulus reduction array, and the third modulus reduction array with dummy values. The method further includes storing the plurality of source data objects in a source data object array, and storing the first modulus reduction array, the second modulus reduction array, and the third modulus reduction array in a short term memory.

The real-time streaming data may further include the data object identifiers carrying numerical timestamp information indicating times of last updates made to the corresponding source data objects.

The method may further include receiving a notification of a change in a source data object of the plurality of source data objects and identifying a sequence number, I, of the data object identifier corresponding to the changed source data object. The method also includes computing a first remainder position $I_1$ of the number I in the first modulus reduction array and storing a numerical timestamp, corresponding to the I-th data object identifier, in the $I_1$-th position of the first modulus reduction array. $I_1$ is a remainder after dividing I by $N_1$. The method further includes computing a second remainder position $I_2$ of the of the number I in the second modulus reduction array and storing the numerical timestamp, corresponding to the I-th data object identifier, in the $I_2$-th position of the second modulus reduction array. $I_2$ is a remainder after dividing I by $N_2$. The method also includes computing a third remainder position $I_3$ of the of the number I in the third modulus reduction array and storing the numerical timestamp, corresponding to the I-th data object identifier, in the $I_3$-th position of the third modulus reduction array. $I_3$ is a remainder after dividing I by $N_3$.

The method further includes updating the deduplicated source data array, based on the numerical timestamps in the $I_1$-th position of the first modulus reduction array, in the $I_2$-th position of the second modulus reduction array, and in the $I_3$-th position of the third modulus reduction array.

The updating the deduplicated source data array, based on the numerical timestamps in the $I_1$-th position of the first modulus reduction array, in the $I_2$-th position of the second modulus reduction array, and in the $I_3$-th position of the third modulus reduction array may include sequentially comparing the numerical timestamps in the $I_1$-th position of the first modulus reduction array, in the $I_2$-th position of the second modulus reduction array, and in the $I_3$-th position of the third modulus reduction array with the current time, marking a data object identifier, corresponding to the numerical timestamp stored in the $I_1$-th position of the first modulus reduction array, in the $I_2$-th position of the second modulus reduction array, and in the $I_3$-th position of the third modulus reduction array, for updating, if the current time exceeds the numerical timestamp by more than a predetermined staleness threshold value, updating the numerical timestamp corresponding to the marked data object identifier to the current time, and storing the changed source data object, corresponding to the marked data object identifier, in the deduplicated source data array.

In an aspect of the disclosed subject matter, a non-transitory machine-readable storage medium is disclosed that provides instructions that, if executed by a processor, are configurable to cause said processor to perform operations and methods for predicting, based on a previous usage of a cloud-based computing resource by a plurality of users of the cloud-based computing resource, a future usage of the cloud-based computing resource as disclosed herein.

In an aspect of the disclosed subject matter, a system is disclosed for storing and managing source data related to a number of tenants in a public cloud network. The system may include a computer processor configured to run a public cloud network digitally connected with the computer processor. The system may also include a non-transitory machine-readable storage medium that provides instructions that are configurable to cause the apparatus to perform any of the methods disclosed herein.

FIG. 1A is a block diagram illustrating a traditional method 100 of receiving real-time streaming data and updating database tables. The streaming data includes a source data array 102 that includes source data objects 104, 106, 108 and so on. The streaming data also includes a data object identifier array 112 of data object identifiers 114, 116, 118 and so on. The data object identifiers 114, 116, 118 essentially identify and point to corresponding source data objects 104, 106, 108 in the source data array 102. Specifically, data object identifier 114 identifies and points to source data object 104, data object identifier 116 identifies and points to source data object 106, data object identifier 118 identifies and points to source data object 108, and so on. Further, the data object identifiers 114, 116, 118 may be arranged in a sequence in the data object identifier array 112. In the example of FIG. 1A, assuming that both of the source data array 102 and the data object identifier array 112 are of length 1000, the data object identifiers may be sequentially numbered as 0, 1, 2, . . . 999 etc. The contents of the data object identifiers 114, 116, 118 are typically either "1" or "0" indicating, respectively, whether the corresponding source data objects need to be updated or not. For instance, data object identifiers 114, 116, 118 contain, respectively, 1, 0, and 1, and that indicates that the source data objects 114 and 118 need to be updated, while 116 does not need to be updated.

Traditional data streaming and updating methods of FIG. 1A typically track each source data object individually and may be burdened by permanent disk delays. A disadvantage of the traditional methods is that sometimes the source data objects are updated so frequently that the replication process tends to fall behind. The problem is further compounded when one source data object is updated multiple times in short succession but in separate processing windows. In other words, the default update process requires two or more syncs whereas only the later or the latest sync would have been sufficient. Further, traditional data tables, as represented in FIG. 1A, contain the source data in one row per object and in millions of such rows per account. The sheer size of the data tables and the associated storage speed sometimes delay the update process, owing to "write-lock" and other such delay situations. There is a need for more efficient and deduplicated process of data replication and storage.

In an embodiment of the present disclosure, the Chinese Remainder Theorem from Number Theory may be leveraged to arrive at an optimal number of shorter modulus reduction arrays such that an item with a sequentially numbered identifier "I" in a longer, original array can be uniquely determined by its position in each of the shorter arrays. In addition, numerical timestamps may be stored in the cells of the shorter arrays indicating the time of last update for the cell. Operationally, the cells can be checked sequentially, and if a timestamp is found to be older than a threshold time period, the corresponding cell may be processed for an update.

As is commonly known in Number Theory, Chinese Remainder Theorem (CRT) is used to solve a set of different congruent equations with one unknown variable (say, X) and different moduli (say, $m_1$, $m_2$, $m_3$ . . . etc.) which are mutually prime with corresponding remainders $a_1$, $a_2$, $a_3$ . . . etc.

In other words, given:

$X = a_1 (\text{mod } m_1)$ $X = a_2 (\text{mod } m_2) \ldots$ $X = a_N (\text{mod } m_N)$ Then, for N=3:
M can be defined as ($m_1 * m_2 * m_3$),
$M_1$ can be defined as ($M/m_1$),
$M_2$ can be defined as ($M/m_2$), and
$M_3$ can be defined as ($M/m_3$).
Further,
$M^{-1} * M_1$ can be defined as 1(mod $m_1$)
$M^{-2} * M_2$ can be defined as 1(mod $m_2$)
$M^{-3} * M_3$ can be defined as 1(mod $m_3$)

By applying Chinese Remainder Theorem, these equations have a unique solution for X, if the moduli are mutually prime, such that:

$X = (a_1 M_1 M^{-1} + a_2 M_2 M^{-2} + \ldots + a_N M_3 M^{-3}) * \text{mod } M$ To elaborate further, a non-limiting and only illustrative numerical example of application of Chinese Remainder Theorem (CRT), for N=3, is provided below:

Given:

$$X=2(\mod 3) \; [a_1=2, m_1=3]$$

$$X=3(\mod 5) \; [a_2=3, m_{2=5}]$$

$$X=2(\mod 7) \; [a_3=2, m_3=7]$$

M can be obtained as (3*5*7)=105
Therefore, $$M_1=(M/m_1)=(105/3)=35$$

$$M_2=(M/m_2)=(105/5)=21$$

$$M_3=(M/m_3)=(105/7)=15$$

Further, $$M^{-1}*35=1(\mod m_1)=1(\mod 3); \text{ [therefore, } M^{-1}=2]$$

$$M^{-2}*21=1(\mod m_2)=1(\mod 5); \text{ [therefore, } M^{-2}=1]$$

$$M^{-3}*15=1(\mod m_3)=1(\mod 7); \text{ [therefore, } M^{-3}=1]$$

The moduli $m_1$, $m_2$, $m_3$ are evidently relatively prime and by applying Chinese Remainder Theorem, the above equations have a unique solution:

$$X=(2*35*2+3*21*1+2*15*1)*\mod 105=23$$

Figure 1B:
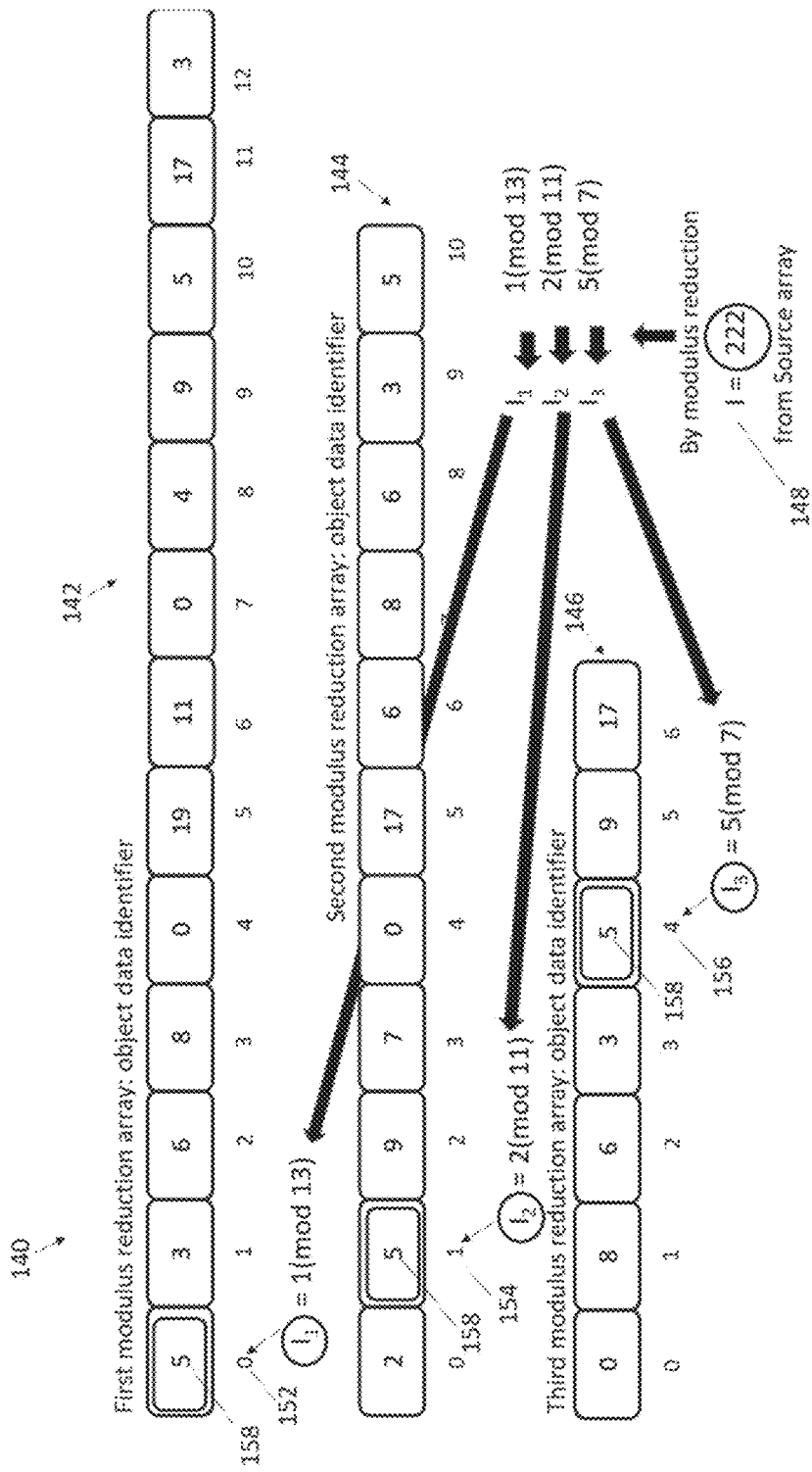
FIG. 1B illustrates a simplified block diagram illustrating an example method of receiving real-time streaming data and updating database tables, in accordance with one embodiment of this disclosure.

FIG. 1B is a block diagram illustrating an example improved method 140 of receiving real-time streaming data and updating database tables. The method leverages data deduplication techniques that exploit the mathematical properties of sequential arrays and time-based synchronization to reduce memory usage and processing such that analysis of large streaming changes can be handled in-memory efficiently. Specifically, modulus reduction arrays, as illustrated above, may be used to arrange and rearrange data and data pointers such that a long array (such as 112 of FIG. 1A) may be broken into several shorter arrays (such as 3 arrays, $N_1$, $N_2$ and $N_3$) with no loss of positional information. Specifically, the shorter arrays may be devised such that they have prime-numbered lengths, and multiplication of the lengths of these shorter arrays produces a number (i.e., $N_1*N_2*N_3$) larger than the original size (i.e., N) of the longer array.

Referring to the example of FIG. 1B, the integer number N of data object identifiers in the sequenced source data array may be determined to be 1000. Further, the three mutually prime integers $N_1$, $N_2$, and $N_3$ may be selected to be 13, 11, and 7, respectively, such that $N_1$ (i.e., 13) is greater than $N_2$ (i.e., 11), and $N_2$ (i.e., 11) is greater than $N_3$ (i.e., 7), and the arithmetic product of $N_1$, $N_2$, and $N_3$ (13*11*7=1001) is greater than N (i.e., 1000). A first modulus reduction array 142 of length $N_1$ (i.e., 13), a second modulus reduction array 144 of length $N_2$ (i.e., 11), and a third modulus reduction array 146 of length $N_3$ (i.e., 7) may be generated. Further, the first modulus reduction array 142 may be initialized with dummy values 5, 3, 6, 8, 0, 19, 11, . . . and so on, the second modulus reduction array 144 may be initialized with dummy values 2, 5, 9, 7, 0, 17, 6, . . . and so on, and the third modulus reduction array 146 may be initialized with dummy values 0, 8, 6, 3, 5, 9, 17, . . . and so on. The source data objects 102, and the first, second, and third modulus reduction arrays 142, 144, and 146 may be stored in a short-term memory.

Referring to FIG. 1B, a notification may be received that a particular source data object has changed and the change needs to be updated in a replicated database. A sequence number I (148) of the data object identifier, corresponding to the source data object that has changed, may be identified. Subsequently, a first remainder position $I_1$ (152) of the number I in the first modulus reduction array 142 may be computed and a numerical timestamp, corresponding to the I-th data object identifier (148), may be stored in the $I_1$-th position of the first modulus reduction array 142. $I_1$ is a remainder after dividing I by $N_1$. In the example of FIG. 1B, I is selected to be 222 and $N_1$ is selected to be 13. Therefore, $I_1$ is "1". Accordingly, a numerical timestamp "5" (158), corresponding to the I-th data object identifier (148) is stored in the first position (152) in the first modulus reduction array 142.

Similarly, a second remainder position $I_2$ (154) of the number I in the second modulus reduction array 144 may be computed and the numerical timestamp, corresponding to the I-th data object identifier (148) may be stored in the $I_2$-th position of the second modulus reduction array 144. $I_2$ is a remainder after dividing I by $N_2$. In the example of FIG. 1B, I is selected to be 222 and $N_2$ is selected to be 11. Therefore, I2 is "2". Accordingly, the numerical timestamp "5" (158), corresponding to the I-th data object identifier (148) is stored in the second position (154) in the second modulus reduction array 144.

Further, a third remainder position $I_3$ (156) of the number I in the third modulus reduction array 146 may be computed and the numerical timestamp, corresponding to the I-th data object identifier may be stored in the $I_3$-th position of the third modulus reduction array 146. $I_3$ is a remainder after dividing I by $N_3$. In the example of FIG. 1B, I is selected to be 222 and $N_3$ is selected to be 7. Therefore, $I_3$ is "5". Accordingly, the numerical timestamp "5" (158), corresponding to the I-th data object identifier (148) is stored in the fifth position (156) in the third modulus reduction array 146.

The deduplicated source data array 102 may be updated based on the numerical timestamps 158 in the $I_1$-th position (152) of the first modulus reduction array 142, in the $I_2$-th position (154) of the second modulus reduction array 144, and the $I_3$-th position (156) of the third modulus reduction array 146, as described in more detail below.

Figure 1C:
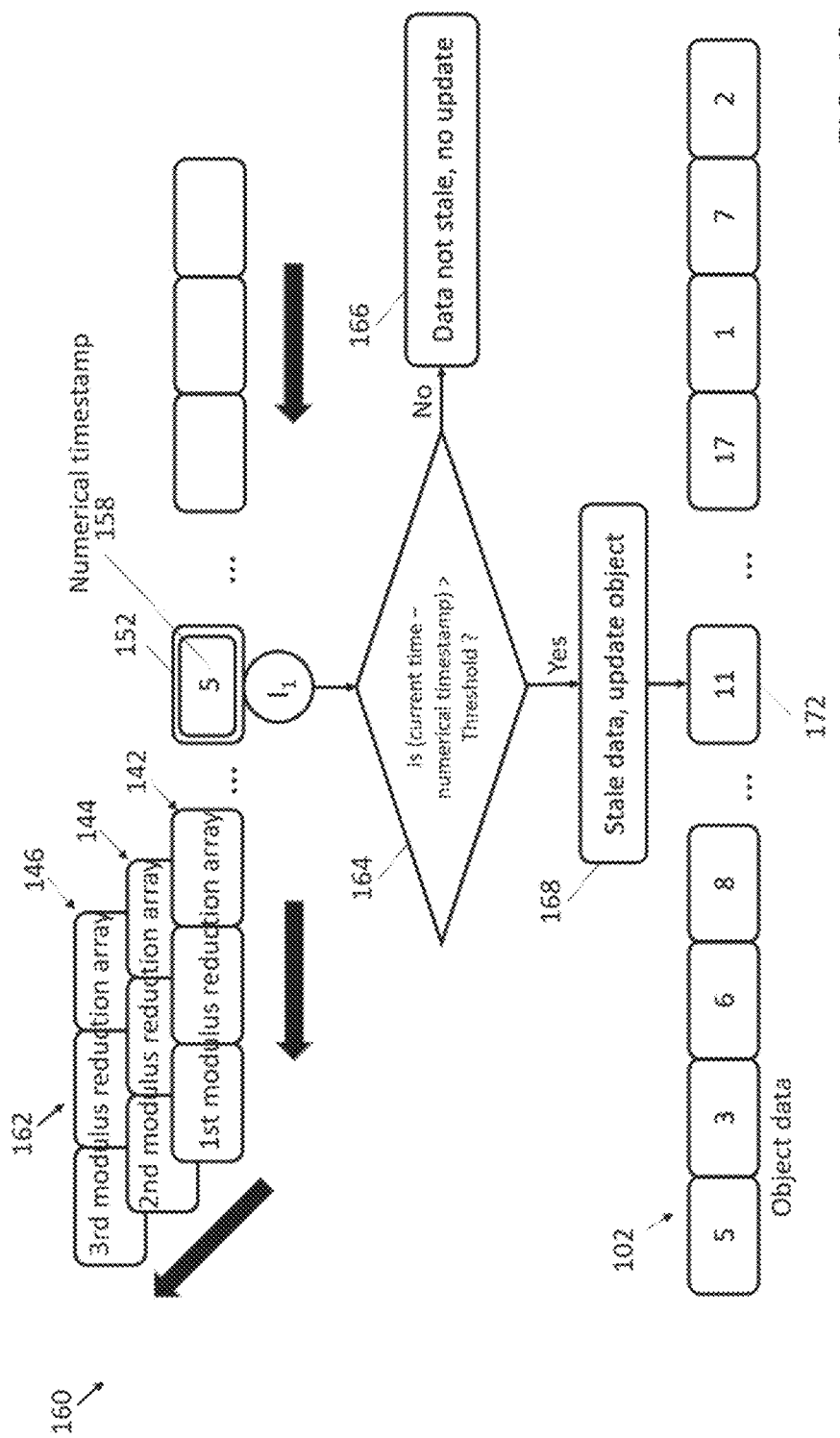
FIG. 1C illustrates a simplified block diagram illustrating an example method of updating a deduplicated source data array, in accordance with one embodiment of this disclosure.

FIG. 1C is a block diagram illustrating an example method 160 for updating the deduplicated source data array based on the numerical timestamps in the first, second, and third modulus reduction arrays. The method 160 may include sequentially comparing the numerical timestamp stored in the $I_1$-th position (152) of the first modulus reduction array 142, in the $I_2$-th position (154) of the second modulus reduction array 144, and in the $I_3$-th position (156) of the third modulus reduction array 146 with the current time, as in 162. To elaborate further, the numerical timestamp stored in the $I_1$-th position (152) of the first modulus reduction array 142, or in the $I_2$-th position (154) of the second modulus reduction array 144, or in the $I_3$-th position (156) of the third modulus reduction array 146 may be checked, as in 164, to determine whether the current time ("NOW") exceeds the corresponding numerical timestamp 158 by more than a predetermined staleness threshold value. If the difference between the current time and the corresponding numerical timestamp 158 is less than the predetermined staleness threshold value, as in 166, the corresponding source data object 172, in source data array 102 is taken to be not-stale and therefore, not updated. On the other hand, if the current time exceeds the corresponding numerical timestamp 158 by more than the predetermined staleness threshold value, as in 168, the corresponding source data object 172, in source data array 102 is taken to be stale and therefore, updated and stored in the deduplicated source data array 102. The comparing and updating steps may progress in a decreasing order of length of the modulus reduction array. In other words, in the example of FIG. 1C, the data object identifiers in the first modulus reduction array 142, of highest length (13) may be checked first, followed by the second modulus reduction array 144 (of length 11), and the third modulus reduction array 146 (of length 7).

Thus, the modulus reduction method and the modulus reduction arrays 142, 144, and 146 effectively reduce the amount of storage required by one or more orders (i.e., from 1000 to (13+11+7)=31) and reduces the amount of time required to evaluate "staleness" of the data objects. In addition, the modulus reduced arrays 142, 144, and 146 may reside entirely in memory as opposed to disk and there may be associated speed gains.

Figure 2A:
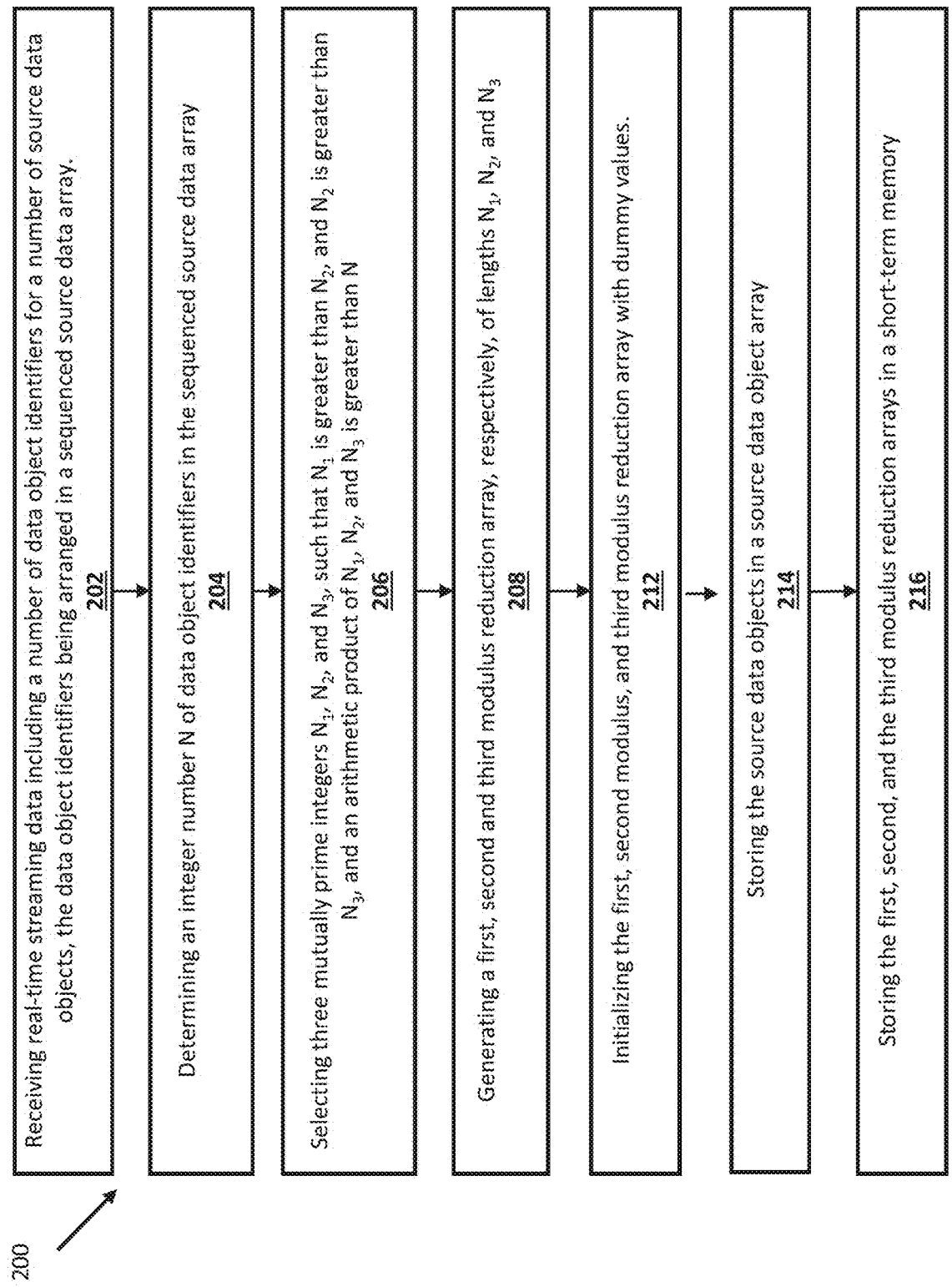
FIG. 2A is a flow diagram illustrating an example method of receiving real-time streaming data and updating a deduplicated source data object array, in accordance with one embodiment of this disclosure.
Figure 3A:
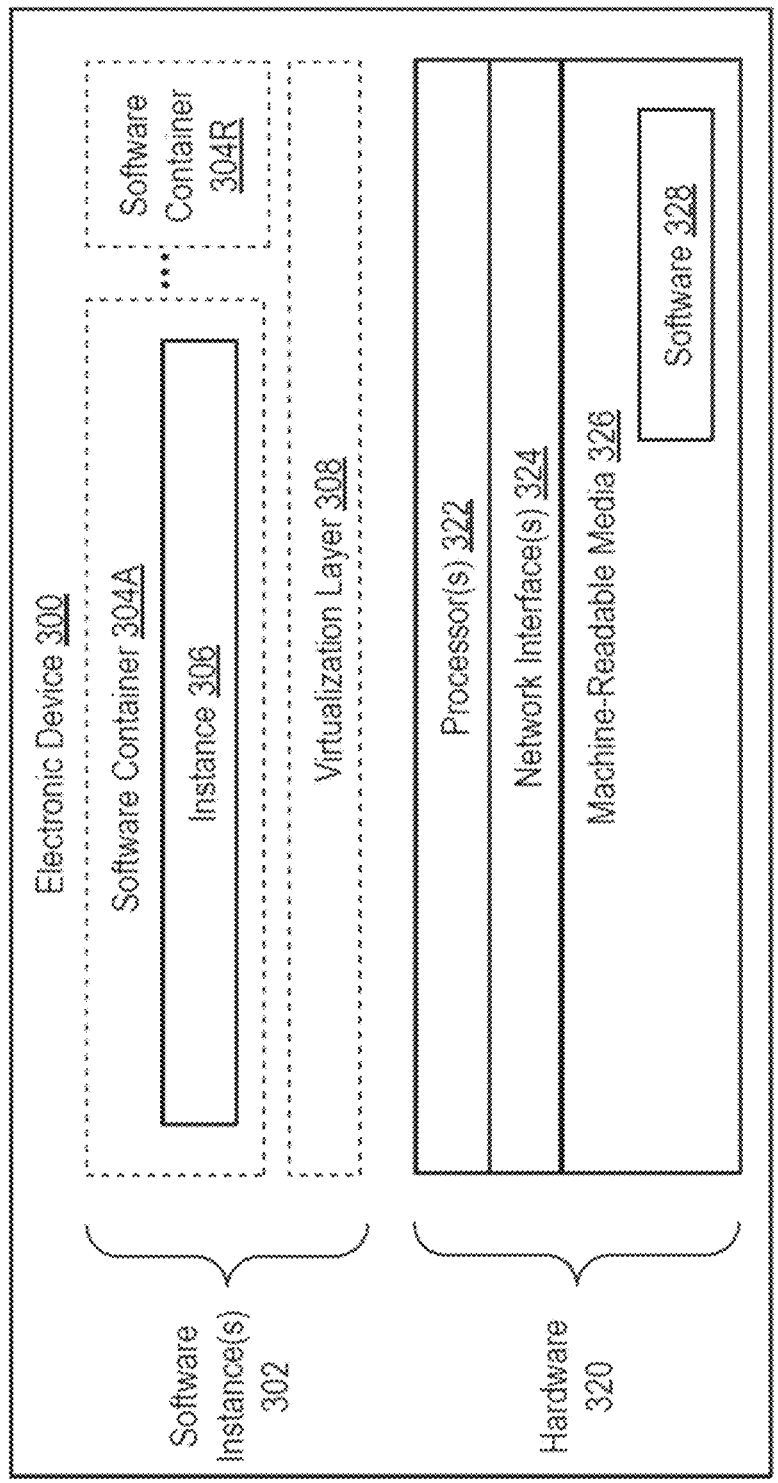
FIG. 3A is a block diagram illustrating an exemplary electronic device according to an example implementation.
Figure 3B:
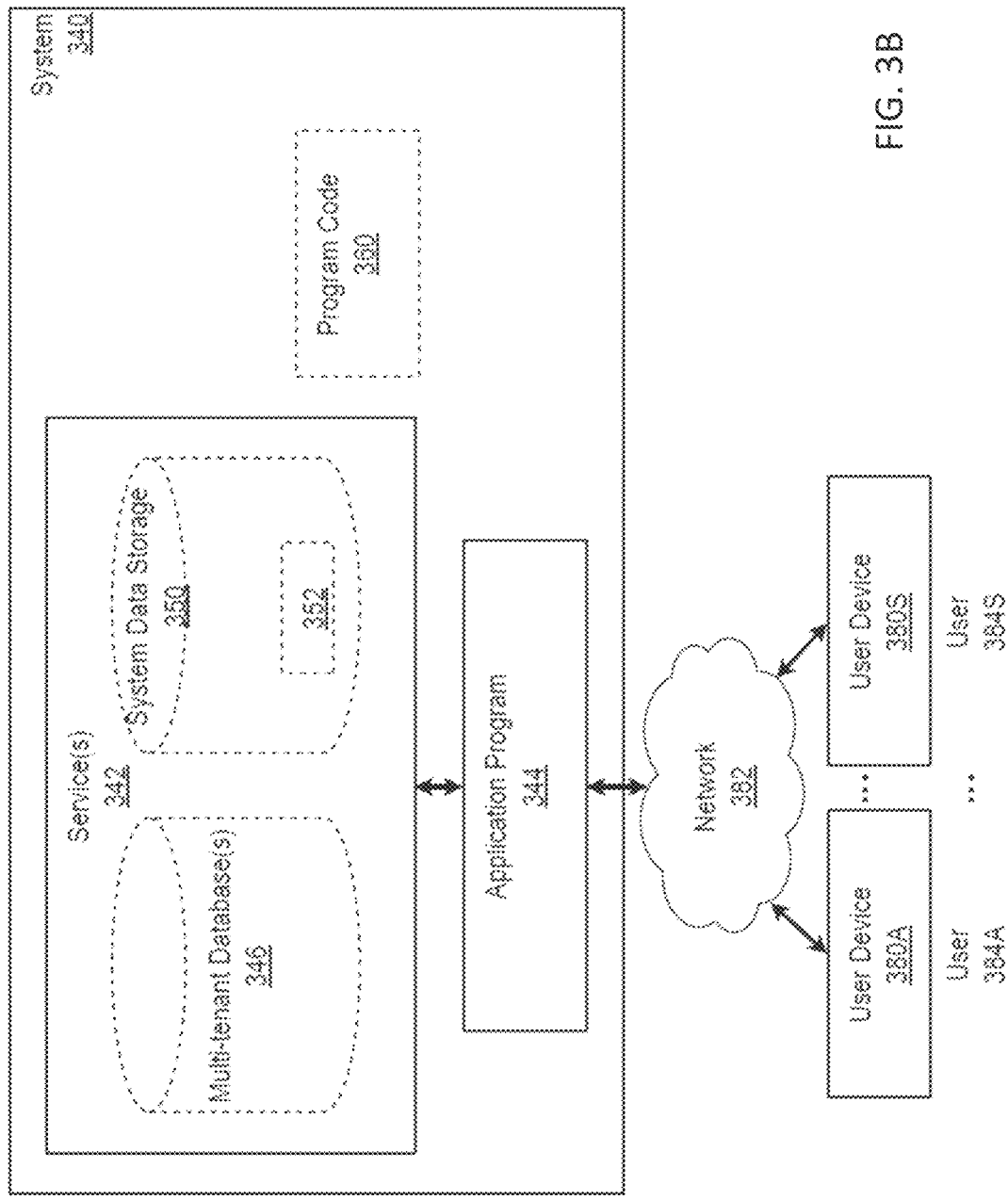
FIG. 3B is a block diagram of an exemplary deployment environment according to an example implementation.

FIG. 2A is a flow diagram illustrating an example method 200 for receiving real-time streaming data and updating a deduplicated source data object array, as disclosed herein. The method 200 may be performed, for example, by a system as shown in FIGS. 1A to 1C operating in conjunction with the hardware as shown in FIGS. 3A and 3B and/or by software executing on a server or distributed computing platform. Although the steps of method 200 are presented in a particular order, this is only for simplicity.

The computer-implemented method 200 may include, as in step 202, receiving real-time streaming data comprising a number of data object identifiers for a number of source data objects. The data object identifiers may be arranged in a sequenced source data array. At 204, an integer number N of data object identifiers in the sequenced source data array may be determined. At 206, three mutually prime integers $N_1$, $N_2$, and $N_3$ may be selected such that $N_1$ is greater than $N_2$, and $N_2$ is greater than $N_3$, and arithmetic product of $N_1$, $N_2$, and $N_3$ is greater than N. At 208, a first modulus reduction array of length $N_1$, a second modulus reduction array of length $N_2$, and a third modulus reduction array of length $N_3$ may be generated. At 212, the first modulus reduction array, the second modulus reduction array, and the third modulus reduction array may be initialized with dummy values. At 214, the source data objects may be stored in a source data object array, and at 216, the first, second, and third modulus reduction array may be stored in a short-term memory.

Figure 2B:
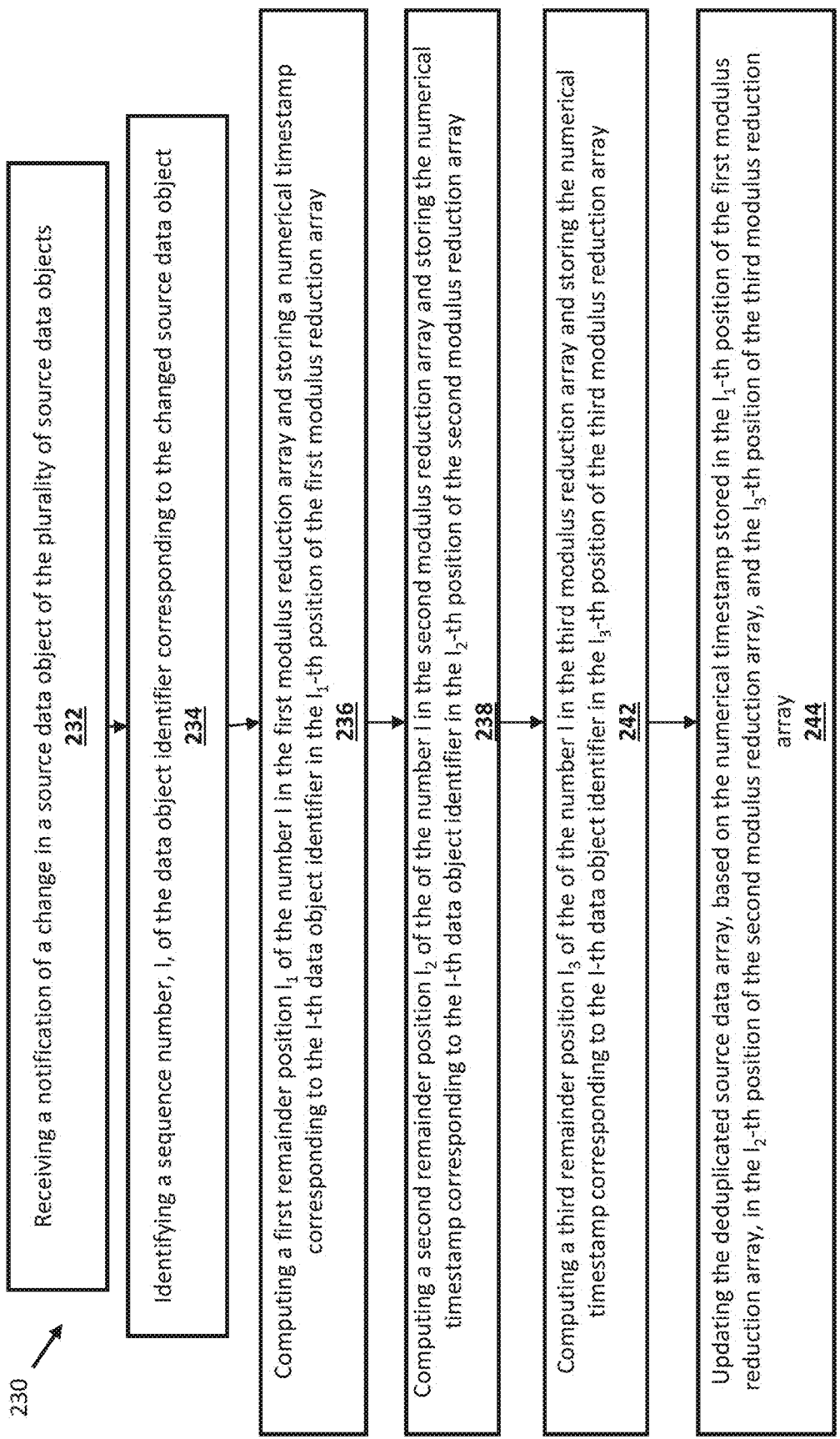
FIG. 2B is a flow diagram illustrating an example method of receiving a change notification and updating a deduplicated source data object array, in accordance with one embodiment of this disclosure.

FIG. 2B is a flow diagram illustrating an example method 230 for receiving a change notification and updating a deduplicated source data object array, as disclosed herein. The method may include receiving a notification of a change in a source data object of the plurality of source data objects, as in 232. At 234, a sequence number, I, of the data object identifier corresponding to the changed source data object may be identified. At 236, a first remainder position $I_1$ of the number I in the first modulus reduction array may be computed and a numerical timestamp, corresponding to the I-th data object identifier, may be stored in the $I_1$-th position of the first modulus reduction array. $I_1$ is a remainder after dividing I by $N_1$. At 238, a second remainder position $I_2$ of the of the number I in the second modulus reduction array may be computed and the numerical timestamp, corresponding to the I-th data object identifier, may be stored in the $I_2$-th position of the second modulus reduction array. $I_2$ is a remainder after dividing I by $N_2$. At 242, a third remainder position $I_3$ of the of the number I in the third modulus reduction array may be computed and the numerical timestamp, corresponding to the I-th data object identifier, may be stored in the $I_3$-th position of the third modulus reduction array. $I_3$ is a remainder after dividing I by $N_3$. At 244, the deduplicated source data array may be updated based on the numerical timestamps in the $I_1$-th position of the first modulus reduction array, in the $I_2$-th position of the second modulus reduction array, and in the $I_3$-th position of the third modulus reduction array.

Figure 2C:
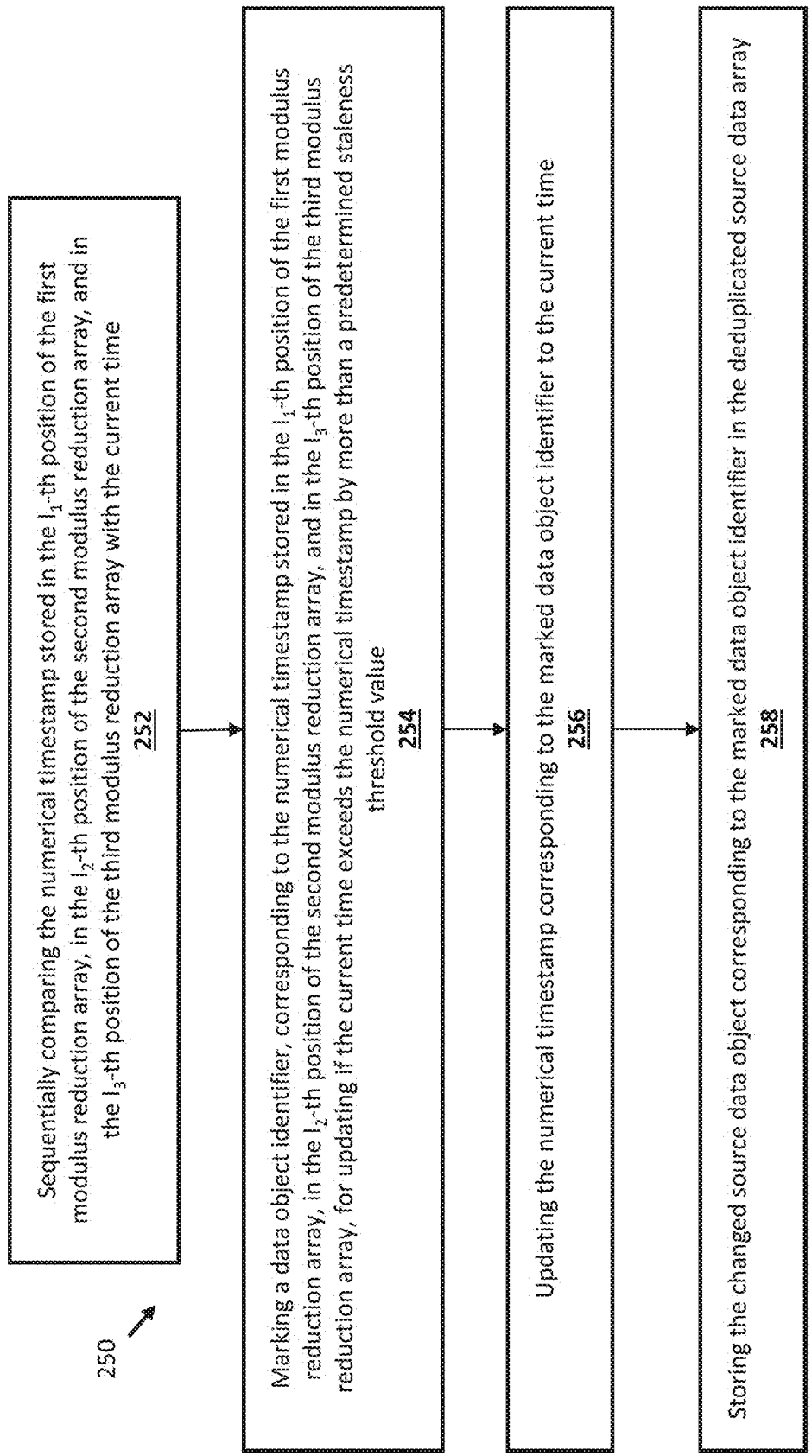
FIG. 2C is a flow diagram illustrating an example method of updating a deduplicated source data array, in accordance with one embodiment of this disclosure.

FIG. 2C is a flow diagram illustrating an example method 250 for updating a deduplicated source data array, based on the numerical timestamps in the first, second and third modulus reduction arrays, as disclosed herein. The updating the deduplicated source data array, based on the numerical timestamps in the $I_1$-th position of the first modulus reduction array, in the $I_2$-th position of the second modulus reduction array, and in the $I_3$-th position of the third modulus reduction array may include sequentially comparing the numerical timestamps in the $I_1$-th position of the first modulus reduction array, in the $I_2$-th position of the second modulus reduction array, and in the $I_3$-th position of the third modulus reduction array with the current time, as in 252. At 254, a data object identifier, corresponding to the numerical timestamp stored in the $I_1$-th position of the first modulus reduction array, in the $I_2$-th position of the second modulus reduction array, and in the $I_3$-th position of the third modulus reduction array, for updating if the current time exceeds the numerical timestamp by more than a predetermined staleness threshold value. At 256, the numerical timestamp corresponding to the marked data object identifier to the current time may be updated. At 258, the changed source data object corresponding to the marked data object identifier may be stored in the deduplicated source data array.

The method and system for data deduplication, as described in the context of FIGS. 1A to 2C above, leverage the mathematical properties of sequential arrays and time-based synchronization to reduce memory usage and processing such that analysis of large streaming changes can be handled in-memory efficiently. Specifically, the modulus reduction arrays of the present disclosure may reduce the need for Cross-Tenant Synchronization (CTS) for massive dataset synchronization and thereby, may significantly reduce the amount of storage required, for example from Quantity(n) to Quantity(log n), and may also reduce the amount of time required to evaluate "staleness" of source data objects. In addition, there may be gains in process speed with the assumption that the modulus reduction arrays can be stored entirely in short term memory as opposed to hard disks. Further, faster and more efficient data replication may mean a smoother and more real-time solution for the customers, while also reducing the costs of resources deployed for an execution team.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system o FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Predictive Product Availability for Grocery Delivery; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("application store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer implemented method of data processing comprising:
   receiving real-time streaming data comprising a plurality of data object identifiers for a plurality of source data objects, the data object identifiers being arranged in a sequenced source data array;
   determining an integer number N of data object identifiers in the sequenced source data array;
   selecting three mutually prime integers $N_1$, $N_2$, and $N_3$, wherein an arithmetic product of $N_1$, $N_2$, and $N_3$ is greater than N, $N_1$ is greater than $N_2$, and $N_2$ is greater than $N_3$;
   generating a first modulus reduction array of length $N_1$, a second modulus reduction array of length $N_2$, a third modulus reduction array of length $N_3$;
   initializing the first modulus reduction array, the second modulus reduction array, and the third modulus reduction array with dummy values;
   storing the plurality of source data objects in a source data object array; and
   storing the first modulus reduction array, the second modulus reduction array, and the third modulus reduction array in a short term memory.

2. The computer implemented method of claim 1, wherein the receiving the real-time streaming data comprises receiving the real-time streaming data comprising the plurality of data object identifiers carrying numerical timestamp information indicating times of last updates made to the corresponding plurality of source data objects.

3. The computer implemented method of claim 2 further comprising: receiving a notification of a change in a source data object of the plurality of source data objects; identifying a sequence number, I, of the data object identifier corresponding to the changed source data object;
   computing a first remainder position I: of the number I in the first modulus reduction array and storing a numerical timestamp, corresponding to the I-th data object identifier, in the I1-th position of the first modulus reduction array, I being a remainder after dividing I by Ni; computing a second remainder position Iz of the of the number I in the second modulus reduction array and storing the numerical timestamp, corresponding to the I-th data object identifier, in the I2-th position of the second modulus reduction array, In being a remainder after dividing I by N2;
   computing a third remainder position Is of the of the number I in the third modulus reduction array and storing the numerical timestamp, corresponding to the I-th data object identifier, in the I-th position of the third modulus reduction array, I3 being a remainder after dividing I by Ns; and updating the deduplicated source data array, based on the numerical timestamp stored in the h-th position of the first modulus reduction array, in the I2-th position of the second modulus reduction array, and in the I3-th position of the third modulus reduction array.

4. The computer implemented method of claim 3, wherein the updating the deduplicated source data array, based on the numerical timestamp stored in the I1-th position of the first modulus reduction array, in the I2-th position of the second modulus reduction array, and in the I3-th position of the third modulus reduction array comprises: sequentially comparing the numerical timestamp stored in the I1-th position of the first modulus reduction array, in the I2-th position of the second modulus reduction array, and in the Is-th position of the third modulus reduction array with the current time; marking a data object identifier, corresponding to the numerical timestamp stored in the I1-th position of the first modulus reduction array, in the I2-th position of the second modulus reduction array, and in the Is-th position of the third modulus reduction array, for updating, if the current time exceeds the numerical timestamp by more than a predetermined staleness threshold value; updating the numerical timestamp corresponding to the marked data object identifier to the current time; and
   storing the changed source data object, corresponding to the marked data object identifier, in the deduplicated source data array.

5. A non-transitory machine-readable storage medium that provides instructions that, when executed by a processor, are configurable to cause said processor to perform operations comprising:

receiving real-time streaming data comprising a plurality of data object identifiers for a plurality of source data objects, the data object identifiers being arranged in a sequenced source data array;

determining an integer number N of data object identifiers in the sequenced source data array;

selecting three mutually prime integers $N_1$, $N_2$, and $N_3$, wherein an arithmetic product of $N_1$, $N_2$, and $N_3$ is greater than N, $N_1$ is greater than $N_2$, and $N_2$ is greater than $N_3$;

generating a first modulus reduction array of length $N_1$, a second modulus reduction array of length $N_2$, a third modulus reduction array of length $N_3$;

initializing the first modulus reduction array, the second modulus reduction array, and the third modulus reduction array with dummy values;

storing the plurality of source data objects in a source data object array; and storing the first modulus reduction array, the second modulus reduction array, and the third modulus reduction array in a short term memory.

6. The non-transitory machine-readable storage medium of claim 5, wherein the real-time streaming data further comprise the plurality of data object identifiers carrying numerical timestamp information indicating times of last updates made to the corresponding plurality of source data objects.

7. The non-transitory machine-readable storage medium of claim 6 further comprising:

receiving a notification of a change in a source data object of the plurality of source data objects;

identifying a sequence number, I, of the data object identifier corresponding to the changed source data object;

computing a first remainder position $I_1$ of the number I in the first modulus reduction array and storing a numerical timestamp, corresponding to the I-th data object identifier, in the $I_1$-th position of the first modulus reduction array, $I_1$ being a remainder after dividing I by $N_1$;

computing a second remainder position $I_2$ of the of the number I in the second modulus reduction array and storing the numerical timestamp, corresponding to the I-th data object identifier, in the $I_2$-th position of the second modulus reduction array, $I_2$ being a remainder after dividing I by $N_2$;

computing a third remainder position $I_3$ of the of the number I in the third modulus reduction array and storing the numerical timestamp, corresponding to the I-th data object identifier, in the $I_3$-th position of the third modulus reduction array, $I_3$ being a remainder after dividing I by $N_3$; and updating the deduplicated source data array, based on the numerical timestamps stored in the $I_1$-th position of the first modulus reduction array, in the $I_2$-th position of the second modulus reduction array, and in the $I_3$-th position of the third modulus reduction array.

8. The non-transitory machine-readable storage medium of claim 7, wherein the updating the deduplicated source data array, based on the numerical timestamps stored in the $I_1$-th position of the first modulus reduction array, in the $I_2$-th position of the second modulus reduction array, and in the $I_3$-th position of the third modulus reduction array comprises:

sequentially comparing the numerical timestamps stored in the $I_1$-th position of the first modulus reduction array, in the $I_2$-th position of the second modulus reduction array, and in the $I_3$-th position of the third modulus reduction array with the current time;

marking a data object identifier, corresponding to the numerical timestamp stored in the $I_1$-th position of the first modulus reduction array, in the $I_2$-th position of the second modulus reduction array, and in the $I_3$-th position of the third modulus reduction array, for updating, if the current time exceeds the numerical timestamp by more than a predetermined staleness threshold value;

updating the numerical timestamp corresponding to the marked data object identifier to the current time; and storing the changed source data object, corresponding to the marked data object identifier, in the deduplicated source data array.

9. A system comprising:

a processor;

a non-transitory machine-readable storage medium that provides instructions that, if executed by the processor, are configurable to cause the system to perform operations comprising:

receiving real-time streaming data comprising a plurality of data object identifiers for a plurality of source data objects, the data object identifiers being arranged in a sequenced source data array;

determining an integer number N of data object identifiers in the sequenced source data array;

selecting three mutually prime integers $N_1$, $N_2$, and $N_3$, wherein an arithmetic product of $N_1$, $N_2$, and $N_3$ is greater than N, $N_1$ is greater than $N_2$, and $N_2$ is greater than $N_3$;

generating a first modulus reduction array of length $N_1$, a second modulus reduction array of length $N_2$, a third modulus reduction array of length $N_3$;

initializing the first modulus reduction array, the second modulus reduction array, and the third modulus reduction array with dummy values;

storing the plurality of source data objects in a source data object array; and storing the first modulus reduction array, the second modulus reduction array, and the third modulus reduction array in a short term memory.

10. The system of claim 9, wherein the real-time streaming data further comprise the plurality of data object identifiers carrying numerical timestamp information indicating times of last updates made to the corresponding plurality of source data objects.

11. The system of claim 10 further comprising:

receiving a notification of a change in a source data object of the plurality of source data objects;

identifying a sequence number, I, of the data object identifier corresponding to the changed source data object;

computing a first remainder position $I_1$ of the number I in the first modulus reduction array and storing a numerical timestamp, corresponding to the I-th data object identifier, in the $I_1$-th position of the first modulus reduction array, $I_1$ being a remainder after dividing I by $N_1$;

computing a second remainder position $I_2$ of the of the number I in the second modulus reduction array and storing the numerical timestamp, corresponding to the I-th data object identifier, in the $I_2$-th position of the second modulus reduction array, $I_2$ being a remainder after dividing I by $N_2$;

computing a third remainder position $I_3$ of the of the number I in the third modulus reduction array and storing the numerical timestamp, corresponding to the I-th data object identifier, in the $I_3$-th position of the third modulus reduction array, $I_3$ being a remainder after dividing I by $N_3$; and updating the deduplicated source data array, based on the numerical timestamps stored in the $I_1$-th position of the first modulus reduction array, in the $I_2$-th position of the second modulus reduction array, and in the $I_3$-th position of the third modulus reduction array.

12. The system of claim 11, wherein the updating the deduplicated source data array, based on the numerical timestamps stored in the $I_1$-th position of the first modulus reduction array, in the $I_2$-th position of the second modulus reduction array, and in the $I_3$-th position of the third modulus reduction array comprises:

sequentially comparing the numerical timestamps stored in the $I_1$-th position of the first modulus reduction array, in the $I_2$-th position of the second modulus reduction array, and in the $I_3$-th position of the third modulus reduction array with the current time;

marking a data object identifier, corresponding to the numerical timestamp stored in the $I_1$-th position of the first modulus reduction array, in the $I_2$-th position of the second modulus reduction array, and in the $I_3$-th position of the third modulus reduction array, for updating, if the current time exceeds the numerical timestamp by more than a predetermined staleness threshold value;

updating the numerical timestamp corresponding to the marked data object identifier to the current time; and storing the changed source data object, corresponding to the marked data object identifier, in the deduplicated source data array.

* * * * *